United States Patent
Clerckx et al.

(10) Patent No.: US 8,532,042 B2
(45) Date of Patent: Sep. 10, 2013

(54) CODEBOOK FOR MULTIPLE INPUT MULTIPLE OUTPUT COMMUNICATION AND COMMUNICATION DEVICE USING THE CODEBOOK

(75) Inventors: Bruno Clerckx, Seoul (KR); Ki Il Kim, Yongin-si (KR); Junil Choi, Seoul (KR); David J. Love, West Lafayette, IN (US); Tae Joon Kim, West Lafayette, IN (US)

(73) Assignees: Samsung Electronics Co., Ltd., Suwon-si (KR); Purdue Research Foundation, West Lafayette, IN (US)

( * ) Notice: Subject to any disclaimer, the term of this patent is extended or adjusted under 35 U.S.C. 154(b) by 357 days.

(21) Appl. No.: 12/874,297

(22) Filed: Sep. 2, 2010

(65) Prior Publication Data

US 2011/0096755 A1 Apr. 28, 2011

Related U.S. Application Data

(60) Provisional application No. 61/239,121, filed on Sep. 2, 2009.

(30) Foreign Application Priority Data

Jun. 21, 2010 (KR) .......................... 10-2010-0058552

(51) Int. Cl.
*H04W 4/00* (2009.01)
(52) U.S. Cl.
USPC ........... 370/329; 370/328; 370/342; 375/267; 375/299

(58) Field of Classification Search
USPC ............................... 370/342, 329; 455/562.1
See application file for complete search history.

(56) References Cited

U.S. PATENT DOCUMENTS

| | | | |
|---|---|---|---|
| 7,995,528 B1* | 8/2011 | Cendrillon et al. ............ | 370/329 |
| 2007/0191066 A1* | 8/2007 | Khojastepour et al. ..... | 455/562.1 |
| 2008/0080459 A1* | 4/2008 | Kotecha et al. ................ | 370/342 |
| 2011/0002263 A1* | 1/2011 | Zhu et al. ....................... | 370/328 |

FOREIGN PATENT DOCUMENTS

| | | |
|---|---|---|
| KR | 10-2008-0027819 | 3/2008 |
| KR | 10-2009-0008037 | 1/2009 |
| KR | 10-2009-0028170 | 3/2009 |
| KR | 10-2009-0046081 | 5/2009 |
| WO | WO 2007/098457 | 8/2007 |

OTHER PUBLICATIONS

Chae et al., "*Coordinated Beamforming with Limited Feedback in the MIMO Broadcasting Channel*," IEEE Journal on Selected Areas in Communications, vol. 26, No. 8, Oct. 2008, pp. 1505-1515.
Nihar Jindal, "*Antenna Combining for MIMO Downlink Channel*," IEEE Transactions on Wireless Communications, vol. 7, No. 10, Oct. 2008. pp. 3834-3844.

* cited by examiner

*Primary Examiner* — Ian N Moore
*Assistant Examiner* — Hien Nguyen
(74) *Attorney, Agent, or Firm* — NSIP Law

(57) ABSTRACT

In a multi-user multiple input multiple output (MIMO) communication, each of receivers may use a different channel codebook and a transmitter may determine beamforming vectors using a beamforming codebook corresponding to each of the receivers.

19 Claims, 7 Drawing Sheets

FIG. 3

$$310 \sim \begin{bmatrix} a \\ b \\ c \\ d \\ e \\ f \\ g \\ h \end{bmatrix} : M_r M_t \times 1$$

⇩

$$320 \sim \begin{bmatrix} a & b & c & d \\ e & f & g & h \end{bmatrix} : M_t \times M_r$$

FIG. 4
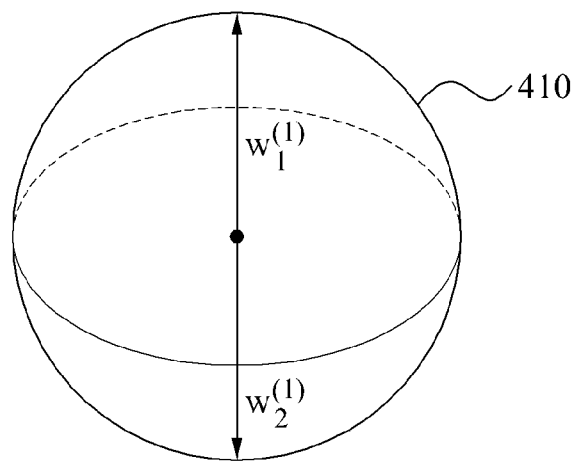
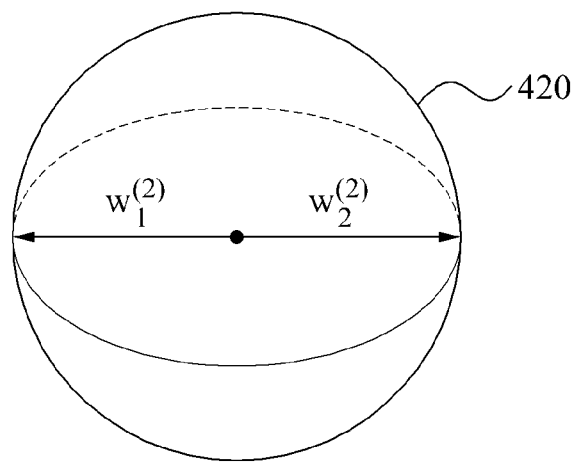
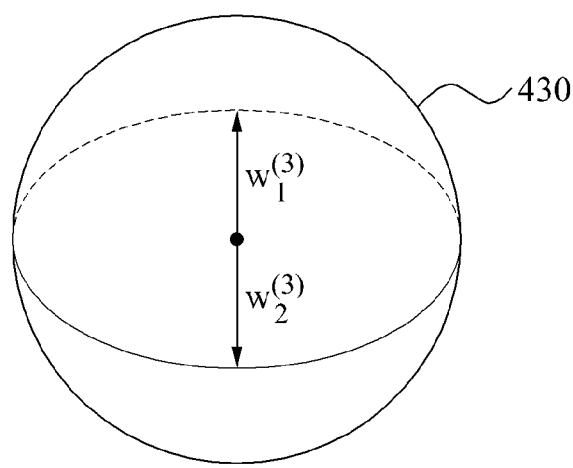

CODEBOOK FOR MULTIPLE INPUT MULTIPLE OUTPUT COMMUNICATION AND COMMUNICATION DEVICE USING THE CODEBOOK

CROSS-REFERENCE TO RELATED APPLICATION(S)

This application claims the benefit under 35 U.S.C. §119(e) of a U.S. Provisional Application No. 61/239,121, filed on Sep. 2, 2009, in the U.S. Patent and Trade Mark Office, and the benefit under 35 U.S.C. §119(a) of a Korean Patent Application No. 10-2010-0058552, filed on Jun. 21, 2010, in the Korean Intellectual Property Office, the entire disclosures of which are incorporated herein by reference for all purposes.

BACKGROUND

1. Field

The following description relates to a codebook for a multiple input multiple output (MIMO) communication, and a communication device using the codebook.

2. Description of Related Art

Studies are being actively pursued to provide a variety of multimedia services and to support higher quality and higher speed of data transmission in a wireless communication environment. Among the studies, a technology associated with a multiple input multiple output (MIMO) communication system using multiple channels has gained rapid attention.

In a MIMO communication system, each of a base station and terminals may use a codebook to appropriately cope with a channel environment. A particular space may be quantized into a plurality of codewords according to a predetermined criterion. The plurality of codewords may be stored as a codebook in each of the base station and the terminals. The codebook may be used for the base station and the terminals to share channel information, and may also be used to determine beamforming vectors.

SUMMARY

In one general aspect, there is provided a communication method of a transmitter for a multi-user multiple input multiple output (MIMO) communication system, the method including: maintaining a memory in which a first channel codebook corresponding to a first receiver and a second channel codebook corresponding to a second receiver are stored; receiving, from the first receiver, information associated with a first preferred codeword among codewords comprised in the first channel codebook, and receiving, from the second receiver, information associated with a second preferred codeword among codewords comprised in the second channel codebook; and determining a first beamforming vector for the first receiver and a second beamforming vector for the second receiver based on the first preferred codeword and the second preferred codeword, wherein the first channel codebook is different from the second channel codebook.

Information associated with the first preferred codeword may be associated with a covariance of a first channel formed between the transmitter and the first receiver, and information associated with the second preferred codeword may be associated with a covariance of a second channel formed between the transmitter and the second receiver.

The codewords comprised in the first channel codebook may be defined based on vectors comprised in a Grassmannian line packing codebook having a dimension of $M_t M_{r1} \times 1$, the codewords comprised in the second channel codebook may be defined based on vector of a Grassmannian line packing codebook having a dimension of $M_t M_{r2} \times 1$, and $M_{r1}$ may denote a number of receive antennas of the first receiver, $M_{r2}$ may denote a number of receive antennas of the second receiver, and $M_t$ may denote a number of transmit antennas of the transmitter.

The vectors comprised in the $(M_t M_{r1} \times 1)$ Grassmannian line packing codebook may be transformed to matrices each having a dimension of $M_t \times M_{r1}$, and the codewords comprised in the first channel codebook may be defined by the $(M_t \times M_{r1})$ matrices, and the vectors comprised in the $(M_t M_{r2} \times 1)$ Grassmannian line packing codebook may be transformed to matrices each having a dimension of $M_t \times M_{r2}$, and the codewords comprised in the second channel codebook may be defined by the $(M_t \times M_{r2})$ matrices.

The determining may include determining the first beamforming vector based on a first beamforming codebook for the first receiver, and determining the second beamforming vector based on a second beamforming codebook for the second receiver, the second beamforming codebook being different from the first beamforming codebook.

The first beamforming codebook may be generated by performing an inner product with respect to a first unitary rotation matrix and each of codewords comprised in a pre-defined base codebook, and the second beamforming codebook may be generated by performing an inner product with respect to a second unitary rotation matrix and each of the codewords comprised in the pre-defined base codebook, and the second unitary rotation matrix being different from the first unitary rotation matrix.

The method may further include providing information associated with the first unitary rotation matrix to the first receiver, and providing information associated with the second unitary rotation matrix to the second receiver.

A minimum distance between first beamforming codewords comprised in the first beamforming codebook may be the same as a minimum distance between second beamforming codewords comprised in the second beamforming codebook.

Each of the first beamforming codebook and the second beamforming codebook may be configured to minimize a correlation between the first beamforming codewords and the second beamforming codewords.

The determining may include: calculating a sum rate with respect to the first receiver and the second receiver based on a criterion that each of the first receiver and the second receiver corresponds to a zero-forcing linear receiver; and selecting the first beamforming vector for the first receiver and the second beamforming vector for the second receiver based on the sum rate with respect to the first receiver and the second receiver.

The method may further include: calculating interference statistics based on an inner product between the first beamforming vector and a Hermitian of the first beamforming vector, and an inner product between the second beamforming vector and a Hermitian of the second beamforming vector; and providing information associated with the interference statistics to the first receiver and the second receiver.

In another general aspect, there is provided a communication method of a second receiver for a multi-user MIMO communication system comprising a transmitter, a first receiver, and the second receiver, the method including: maintaining a memory in which a second channel codebook corresponding to the second receiver are stored, the second channel codebook being different from a first channel codebook corresponding to the first receiver; calculating a covariance of a second channel formed between the transmitter and the second receiver; selecting a second preferred codeword from codewords comprised in the second channel codebook, based on the covariance of the second channel; providing information associated with the second preferred codeword to the transmitter; recognizing a second beamforming vector when the transmitter uses the second beamforming vector based on the second preferred codeword; and calculating a reception combining vector according to the second beamforming vector and the second channel.

The method may further include calculating an effective channel formed between the transmitter and the second receiver, based on a dedicated pilot for the second receiver that is transmitted from the transmitter, wherein the recognizing may include recognizing the second beamforming vector based on the effective channel.

The method may further include receiving information associated with a unitary rotation matrix from the transmitter, when the transmitter determines a first beamforming vector based on a first beamforming codebook for the first receiver and determines the second beamforming vector based on a second beamforming codebook for the second receiver that is different from the first beamforming codebook, and the second beamforming codebook is generated by performing an inner product with respect to the unitary rotation matrix and each of codewords comprised in a pre-defined base codebook, wherein the recognizing may include recognizing the second beamforming vector using information associated with the unitary rotation matrix.

The method may further include receiving, from the transmitter, information associated with interference statistics that are calculated based on an inner product between a first beamforming vector for the first receiver and a Hermitian of the first beamforming vector, and an inner product between the second beamforming vector and a Hermitian of the second beamforming vector, wherein the calculating of the reception combining vector may include calculating the reception combining vector based on the interference statistics.

In still another general aspect, there is provided a terminal for a multi-user MIMO communication system comprising a transmitter and another terminal, the terminal including: a memory configured to store a channel codebook corresponding to the terminal, the channel codebook being different from a channel codebook corresponding to the another terminal; a receiving unit configured to receive a signal from the transmitter; a channel estimator configured to estimate a channel formed between the terminal and the transmitter; a processor configured to select a preferred codeword from codewords comprised in the channel codebook based on a covariance of the channel formed between the terminal and the transmitter; and a transmitting unit configured to provide information associated with the preferred codeword to the transmitter.

The processor may calculate a reception combining vector according to a beamforming vector and the channel formed between the terminal and the transmitter, the beamforming vector being provided by the transmitter based on the preferred codeword.

The channel estimator may estimate an effective channel formed between the terminal and the transmitter, based on a dedicated pilot for the terminal that is transmitted from the transmitter, and the beamforming vector may be recognized by the terminal based on the effective channel.

The receiving unit may receive information associated with a unitary rotation matrix from the transmitter, when the transmitter determines a beamforming vector based on a beamforming codebook for the another terminal and determines the beamforming vector based on a beamforming codebook for the terminal that is different from the beamforming codebook for the another terminal, and the beamforming codebook for the terminal is generated by performing an inner product with respect to the unitary rotation matrix and each of codewords comprised in a pre-defined base codebook. And the beamforming vector for the terminal may be recognized by the terminal using information associated with the unitary rotation matrix.

The receiving unit may receive, from the transmitter, information associated with interference statistics that are calculated based on an inner product between a beamforming vector for the another terminal and a Hermitian of the beamforming vector for the another terminal, and an inner product between the beamforming vector for the terminal and a Hermitian of the beamforming vector for the terminal, and the processor may calculate the reception combining vector based on the interference statistics.

Other features and aspects will be apparent from the following detailed description, the drawings, and the claims.

BRIEF DESCRIPTION OF THE DRAWINGS

FIG. 3 is a diagram illustrating an example of a vector included in an ($M_t M_r \times 1$) Grassmannian line packing codebook and an ($M_t \times M_r$) matrix based on the vector.

FIG. 4 is a diagram illustrating an example where codewords included in one codebook and codewords included in each of other codebooks are barely correlated.

Figure 1:
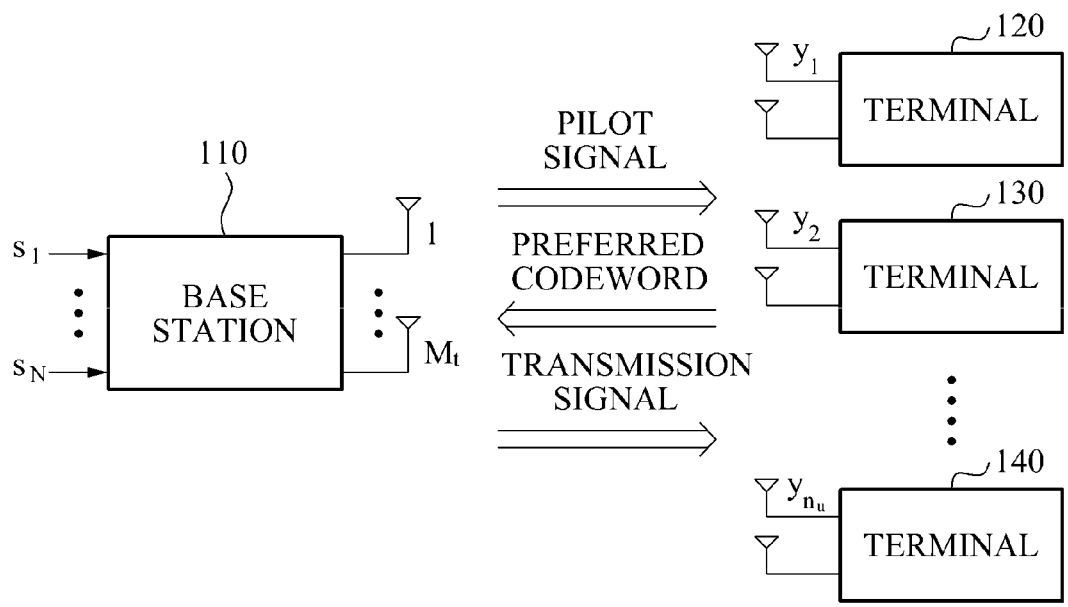
FIG. 1 is a diagram illustrating an example of a closed-loop multi-user multiple input multiple output (MIMO) communication system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, description of well-known functions and constructions may be omitted for increased clarity and conciseness.

FIG. 1 illustrates an example of a multiple input multiple output (MIMO) communication system.

Referring to FIG. 1, the communication system, for example, a closed-loop multi-user MIMO communication system may include a base station 110 and terminals 120, 130, and 140 of users. Even though embodiments may be applicable to an uplink, descriptions are generally made based on a downlink case for ease of description. The term "closed-loop" indicates that the terminals 120, 130, and 140 feed back information containing channel information to the base station 110. The base station 110 may perform beamforming based on the feedback information.

A plurality of antennas may be installed in the base station 110. A single antenna or a plurality of antennas may be installed in each of the terminals 120, 130, and 140. Channels may be formed between the base station 110 and the terminals 120, 130, and 140. A signal may be transmitted and be received via each of the channels.

When a channel formed between the base station 110 and a terminal of a user k is referred to as $H_k$, the base station 110 may transmit a common pilot so that the terminal of the user k may estimate the channel $H_k$. In this instance, the terminal of the user k may estimate the channel $H_k$ and then may determine a codeword, for example, a preferred codeword, from codewords included in a codebook based on the estimated channel $H_k$. The terminal of the user k may feed back information associated with the preferred codeword to the base station 110. The base station 110 may determine a beamforming vector for the terminal of the user k that is used to perform beamforming of data streams $(S_1, S_N)$.

According to an embodiment, the base station 110 may transmit a dedicated pilot for the terminal of the user k. The terminal of the user k may estimate an effective channel $H_k w_k$ using the dedicated pilot. Here, $w_k$ denotes a beamforming vector for the terminal of the user k. To verify information associated with the channel $H_k$, that is, channel information, the base station 110 may use the codebook, and may also use a codebook storing candidates of the beamforming vector. When the codebook storing the candidates of the codebook is used, the base station 110 may select, as the beamforming vector, one of the candidates of the beamforming vector.

Figure 2:
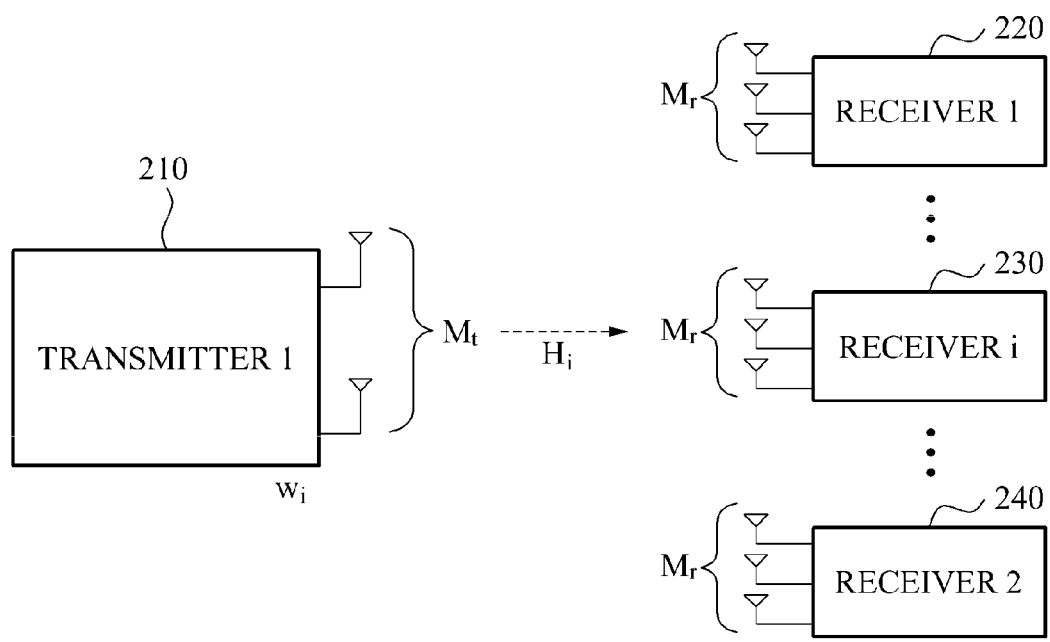
FIG. 2 is a diagram illustrating an example of a transmitter including $M_t$ transmit antennas and receivers each including $M_r$ receive antennas.

FIG. 2 illustrates an example of a transmitter including $M_t$ transmit antennas and receivers each including $M_r$ receive antennas.

Referring to FIG. 2, the transmitter (1) 210 may include $M_t$ transmit antennas and each of receivers (1, i, 2) 220, 230, and 240 may include $M_r$ receive antennas. Here, a number of the receivers is assumed as K. The transmitter (1) 210 may be a base station, a relay station, and the like in a downlink communication, and may be a terminal in an uplink communication. Similarly, each of the receivers (1, i, 2) 220, 230, and 240 may be a terminal in the downlink communication, and may be a base station or a relay station in the uplink communication.

Hereinafter, examples of a case where $M_r$ is greater than or equal to $M_t$ and a case where $M_r$ is less than $M_t$ will be described.

For example, where $M_r$ is greater than or equal to $M_t$, when each of a transmitter and receivers uses a channel codebook having a limited size so as to share channel information, the transmitter may obtain, from each of the receivers, partial channel information that may also be referred to as channel state information. When it is assumed that the transmit power for each of the receivers is equal, the transmit power of P/K may be allocated to each of the receivers. Here, P denotes the total transmit power. A received signal vector $y_i$ in a receiver i may be represented by the following Equation 1.

$$y_i = \sqrt{\frac{\rho}{K}} H_i w_i x_i + \sum_{j \neq i}^{K} \sqrt{\frac{\rho}{K}} H_i w_j x_j + n_i \quad \text{[Equation 1]}$$

In Equation 1, $H_i \in C^{M_r \times M_t}$, $C^{M_r \times M_t}$ denotes a complex space having a dimension of $M_r \times M_t$, $w_i$ denotes a beamforming vector for the receiver i, and $n_i$ denotes a normalized noise vector. Entries of $n_i$ are identically and dependently distributed according to a standard normalization distribution N(0, 1). In addition, $x_i$ denotes a transmitted symbol whose energy is $E[|x_i|^2]=1$, and $\rho=P/\sigma^2$ denotes a signal-to-noise ratio (SNR).

The receiver i may estimate a channel H, formed between the transmitter and the receiver i using a common pilot transmitted to the receiver i. When the received signal vector $y_i$ in the receiver i is modeled as shown above in Equation 1, the receiver i may calculate a covariance $H_i^* H_i$ of the channel $H_i$. The receiver i may calculate $H_i^* H_i / \|H_i\|_F^2 \in C^{M_t \times M_t}$. Here, $H_i^*$ denotes a Hermitian of $H_i$, and $\|H_i\|_F^2$ denotes a square of a Frobenius norm of $H_i$.

The receiver i may select a codeword, that is, may be referred to as a preferred codeword, corresponding to $H_i^* H_i / \|H_i\|_F^2 \in C^{M_t \times M_t}$ using a channel codebook $g^{(i)}$ having a size of N1. Here, $g^{(i)}$ may include N1 codewords as shown below by Equation 2.

$$g^{(i)} = \{G_1^{(i)}, G_2^{(i)}, \ldots, G_{N1}^{(i)}\} \quad \text{[Equation 2]}$$

In Equation 2, among the codewords included in $g^{(i)}$, the preferred codeword may be selected as shown below by Equation 3.

$$G_I^{(i)} = \underset{G_l^{(i)} \in g^{(i)}}{\operatorname{argmin}} \left\| \frac{H_i^* H_i}{\|H_i\|_F^2} - G_l^{(i)} \right\|_F^2 \quad \text{[Equation 3]}$$

In this example, $G_l^{(i)} \in C^{M_t \times M_t}$, and each receiver may have a different channel codebook $g^{(i)}$. For example, a receiver 1 may have a channel codebook $g^{(1)}$, and a receiver 2 may have a channel codebook $g^{(2)}$. The codewords $G_l^{(i)} \in C^{M_t \times M_t}$ may be respectively generated based on vectors included in a Grassmannian line packing codebook having a dimension of $M_t M_r \times 1$, as shown below by Equation 4.

$$G_l^{(i)} = \operatorname{mat}(v_l^{(i)}) \operatorname{mat}(v_l^{(i)})^* \quad \text{[Equation 4]}$$

In Equation 4, $v_l^{(i)} \in \Omega^{M_r M_t \times 1}$ corresponds to a vector included in the Grassmannian line packing codebook $\{v_l^{(i)}\}$. A function $\operatorname{mat}(v_l^{(i)})$ may transform a vector $v_l^{(i)}$ to a matrix having a dimension of $M_r \times M_{r1}$. For example, the function $\operatorname{mat}(v_l^{(i)})$ may generate the $(M_r \times M_{r1})$ matrix by stacking elements of the vector $v_l^{(i)}$ column-wisely. $\Omega^{A \times B}$ denotes an orthonormal matrix space having a dimension of A×B.

FIG. 3 illustrates an example of a vector 310 included in an $(M_t M_r \times 1)$ Grassmannian line packing codebook and an $(M_t \times M_r)$ matrix 320 based on the vector.

Referring to FIG. 3, the vector 310 has a dimension of $M_t M_r \times 1$, and the matrix 320 has a dimension of $M_t \times M_r$. Here, it is assumed that $M_t$ is 2 and $M_r$ is 4 for illustration.

The vector 310 corresponds to an element of the $(M_t M_r \times 1)$ Grassmannian line packing codebook $\{v_l^{(i)}\}$, and the matrix 320 may be generated by stacking elements of the vector 310 column-wisely.

Here, it is assumed that receivers use a linear combining scheme and a receiver i error-free estimates $H_i$ using a common pilot in a measurement time, and error-free estimates an effective channel $H_i w_i$ of $H_i$ using a dedicated pilot in a demodulation time. Here, $w_i$ denotes a beamforming vector used by a transmitter for the receiver i, and $w_i$ may be selected from a beamforming codebook having a size of N2. A zero-forcing linear combiner may be represented by the following Equation 5.

$$z_i = \frac{H_i(H_i^* H_i)^{-1} w_{n_i}^{(i)}}{\|H_i(H_i^* H_i)^{-1} w_{n_i}^{(i)}\|_2}$$ [Equation 5]

In this example, so as to distinguish a beamforming vector for the receiver i from other receivers, the beamforming vector for the receiver i is assumed as $w_{n_i}^{(i)}$. Here, $n_i$ denotes an index of the beamforming vector for the receiver i in a beamforming codebook for the receiver i. When a dedicated pilot is used, the receiver i may calculate $w_{n_i}^{(i)}$ by estimating the effective channel $H_i w_{n_i}^{(i)}$. However, when the dedicated pilot is not used, the transmitter may inform the receiver i about $w_{n_i}^{(i)}$ in a downlink communication.

When a preferred codeword of each of the receivers is $G_{l_1}^{(1)}, G_{l_2}^{(2)}, \ldots, G_{l_K}^{(K)}$, each of the receivers may feed back $l_1, l_2, \ldots, l_K$ to the transmitter. Here, $l_i$ denotes an $l^{th}$ codeword in the channel codebook $g^{(i)}$. Each of the receivers may feed back $\|H_i\|_F^2$ to the transmitter so that the transmitter may perform appropriate scheduling.

The transmitter may generate K beamforming vectors for the receivers based on the preferred codeword of each of the receivers. Each of the receivers may have a different beamforming codebook, and the transmitter may select the K beamforming vectors from a beamforming codebook corresponding to each of the receivers. The beamforming vectors selected by the transmitter may be represented by "$w_{n_1}^{(1)}, w_{n_2}^{(2)}, \ldots, w_{n_K}^{(K)} \in \Omega^{M_t \times 1}$". Each of the beamforming codebooks corresponding to the receivers may be a Grassmannian line packing codebook. For example, beamforming codebooks of the receiver 1 through a receiver K may be represented by the following Equation 6.

$$W^{(1)} = \{w_1^{(1)}, w_2^{(1)}, \ldots, w_{N2}^{(1)}\}, \ldots, W^{(K)} = \{w_1^{(K)}, w_2^{(K)}, \ldots, w_{N2}^{(K)}\}$$ [Equation 6]

In Equation 6, $W^{(i)}$ denotes the beamforming codebook for the receiver i and N2 denotes a size of $W^{(i)}$. The above beamforming codebooks may be differently designed for the corresponding receivers, however, may have the same "minimum distance" property in a Grassmannian manifold. The "minimum distance" denotes a minimum or a smallest distance among distances between codewords included in $W^{(i)}$.

When each of the receivers performs zero-forcing linear combining, the transmitter may select K beamforming vectors according to Equation 7.

$$w_{n_1}^{(1)}, \ldots, w_{n_K}^{(K)} = \operatorname*{argmax}_{w_{n_1}^{(1)}, \ldots, w_{n_K}^{(K)}} \sum_{i=1}^{K} A$$ [Equation 7]

$$= \operatorname*{argmax}_{w_{n_1}^{(1)}, \ldots, w_{n_K}^{(K)}} \sum_{i=1}^{K} B$$

-continued $$(A) = \left(1 + \frac{\frac{\rho}{K}|w_{ni}^{(i)*}(G_{l_i}^{(i)})^{-1} G_{l_i}^{(i)} w_{ni}^{(i)}|^2}{\|w_{ni}^{(i)*}(\|H_i\|_F G_{l_i}^{(i)})^{-1} mat(v_{l_i}^{(i)})\|_2^2}}{1 + \frac{\rho}{K}\sum_{m \neq i}^{K}|w_{ni}^{(i)*}(G_{l_i}^{(i)})^{-1} G_{l_i}^{(i)} w_{nm}^{(m)}|^2}{\|w_{ni}^{(i)*}(\|H_i\|_F G_{l_i}^{(i)})^{-1} mat(v_{l_i}^{(i)})\|_2^2}}\right)$$

$$(B) = \left(1 + \frac{1}{\frac{K}{\rho}\left(w_{ni}^{(i)*}(\|H_i\|_F^2 G_{l_i}^{(i)})^{-1} w_{ni}^{(i)}\right) + \sum_{m \neq i}^{K}|w_{ni}^{(i)*} w_{nm}^{(m)}|^2}\right)$$

Referring to Equation 7, the transmitter may select K beamforming factors so that a sum rate with respect to the receivers may be maximized.

The average sum rate of the transmitter may be represented by the following Equation 8.

$$R_{sum} = E \sum_{i=1}^{K} \log 2\left(1 + \frac{\frac{\rho}{K}|z_i^* H_i w_{n_i}^{(i)}|^2}{1 + \frac{\rho}{K}\sum_{m \neq i}^{K}|z_i^* H_i w_{n_m}^{(m)}|^2}\right)$$ [Equation 8]

In a broadcast channel, the sum rate may be limited in a high SNR region due to interference between the receivers. In a high SNR region, it may be more effective to suppress the interference power than to enhance the desired signal power of each of the receivers. The effective beamforming codebook design scheme may use an increase in the sum rate by suppressing the interference power between the receivers. As one possible scheme for the effective beamforming design, an interference-limited beamforming codebook will be described.

The sum rate having perfect channel information may be represented by the following Equation 9.

$$R_{sum,perf} = E_{v^{(1)} \in \Omega^{M_t \times 1}, \ldots, v^{(K)} \in \Omega^{M_t \times 1}} \sum_{i=1}^{K} \log 2$$ [Equation 9]

$$\left(1 + \frac{1}{\frac{K}{\rho}(v^{(i)*}(H_i^* H_i)^{-1} v^{(i)}) + \sum_{m \neq i}^{K}|v^{(i)*} v^{(m)}|^2}\right)$$

The sum rate of Equation 9 may be lower bounded by the following Equation 10.

$$R_{sum,perf} \geq R_{sum,quant}$$ [Equation 10]

$$R_{sum,quant} =$$

$$E \sum_{i=1}^{K} \log 2\left(1 + \frac{1}{\frac{K}{\rho}\left(w_{ni}^{(i)*}(H_i^* H_i)^{-1} w_{ni}^{(i)}\right) + \sum_{m \neq i}^{K}|w_{ni}^{(i)*} w_{nm}^{(m)}|^2}\right)$$

When it is assumed that interference is limited, $\rho \to \infty$ may be taken with respect to $R_{sum,quant}$. When $\rho \to \infty$ is taken with respect to $R_{sum,quant}$, Equation 11 may be shown as below.

$$R_{sum,quant} \xrightarrow{p \to \infty} E \sum_{i=1}^{K} \log_2\left(1 + \frac{1}{\sum_{m \neq i}^{K} |w_{n_i}^{(i)*} w_{n_m}^{(m)}|^2}\right) \quad \text{[Equation 11]}$$

Referring to Equation 11, a codebook design criterion in the high SNR region indicates that the sum rate is dominated by a separation property between codebooks of different receivers in a unit sphere. That is, the sum rate in the high SNR region may be significantly affected by the separation property between the codebooks of the different receivers.

Each of K receivers may have a single preferred codebook. All the possible permutations of indexes of preferred codewords may be defined as shown below by Equation 12.

$$\{\pi\} = \{\pi_1, \pi_2, \ldots, \pi_{N2^K}\} \quad \text{[Equation 12]}$$
$$= \{(1, 1, \ldots, 1), (1, 1, \ldots, 2), \ldots,$$
$$(N2, N2, \ldots, N2)\}$$

Here, $\pi_i$ denotes a K tuple vector, and elements of the K tuple vector correspond to the indexes of the preferred codewords. A beamforming codebook design objective function may be represented by the following Equation 13.

$$W^{(1)}, W^{(2)}, \ldots, W^{(K)} = \quad \text{[Equation 13]}$$
$$\operatorname*{argmax}_{W^{(1)}, \ldots, W^{(K)}} \sum_{i=1}^{|\{\pi\}|} \sum_{j=1}^{K} \log_2\left(1 + \frac{1}{\sum_{m \neq j}^{K} |w_{\pi_i(j)}^{(j)*} w_{\pi_i(m)}^{(m)}|^2}\right)$$

In Equation 13, the objective function indicates that the beamforming codebook can be designed so that a correlation between codewords of the beamforming codebook for different receivers may be minimized. When the intuitively given beamforming codebook is $W^{(1)}$ and the other beamforming codebook are $W^{(i)}$ (i=2, . . . , K), $W^{(i)}$ may correspond to a tilted version of $W^{(1)}$ or a rotated version of $W^{(1)}$. Also, $W^{(i)}$ and $W^{(1)}$ are positioned within a unit sphere, and it may be effective to maximize the same "minimum distance" property.

FIG. 4 illustrates an example where codewords included in one codebook and codewords included in each of other codebooks are barely correlated.

Each of spheres 410, 420, and 430 of FIG. 4 indicates a space including codewords. Where codewords included in the sphere 410, codewords included in the sphere 420, and codewords included in the sphere 430 are orthogonal with respect to each other, the codewords may have a correlation of "0".

As shown in FIG. 4, when codewords of a codebook corresponding to a particular receiver are orthogonal to codewords of codebooks corresponding to different receivers, optimal codebooks of Equation 13 may be designed.

Optimizing Equation 13 over arbitrary beamforming codebooks may be difficult. In this instance, for example, a systematic beamforming codebook design approach may be provided. When an $M_r$-dimensional Grassmannian line packing codebook, for example, $W_{base} = \{w_1, \ldots, w_{N2}\}$ is assumed, a codebook for K receivers may be designed as shown below by Equation 14.

$$W^{(1)} = \{U_1 w_1, \ldots, U_1 w_{N2}\} \quad \text{[Equation 14]}$$
$$W^{(2)} = \{U_2 w_1, \ldots, U_2 w_{N2}\}$$
$$\ldots$$
$$W^{(K)} = \{U_K w_1, \ldots, U_K w_{N2}\}$$

In Equation 14, $U_i \in \Omega^{M_r \times M_r}$ indicates an $M_r$-dimensional unitary rotation matrix for the receiver i. With respect to a base codebook $W_{base} = \{w_1, \ldots, w_{N2}\}$, the unitary rotation matrix $U_i$ may be optimized according to Equation 13.

The aforementioned systematic beamforming codebook configuration may be an effective structure. For example, the receivers may pre-store the base codebook $W_{base} = \{w_1, \ldots, w_{N2}\}$ and $\{U\}$ including candidates of the rotation matrix. Whenever the receivers access a cell so as to be served by the transmitter, the transmitter may feed forward an index of Ui of the rotation matrix to the receivers. In this case, the receivers may readily change a codebook configuration by rotating the base codebook $W_{base} = \{w_1, \ldots, w_{N2}\}$ using the rotation matrix Ui. For example, when a dedicated pilot is used, the receivers may have no need to be aware of Ui and $W_{base} = \{w_1, \ldots, w_{N2}\}$.

To enhance the overall performance, it is assumed that a feedforward link from the transmitter to each of the receivers is available. Using the feedforward link, the transmitter may broadcast information associated with interference statistics to all the receivers.

In this instance, the interference statistics may be represented by the following Equation 15.

$$T = \sum_{k=1}^{K} w_{n_k}^{(k)} w_{n_k}^{(k)*} \quad \text{[Equation 15]}$$
$$T \in C^{M_t \times M_t}$$

When it is assumed that the interference-limited beamforming codebook is used like Equation 15, the interference statistics of Equation 15 may help the receiver i to design an optimal combining vector $Z_i$. The optimal combining vector $Z_i$ may be represented by the following Equation 16.

$$z_i = \frac{R_i^{-1} H_i w_{n_i}^{(i)}}{\|R_i^{-1} H_i w_{n_i}^{(i)}\|_2} \quad \text{[Equation 16]}$$

In this example, $R_i$ may be calculated according to Equation 17.

$$R_i = \left(H_i(T - w_{n_i}^{(i)} w_{n_i}^{(i)*}) H_i^* + \frac{K}{\rho} I_{M_r}\right) \quad \text{[Equation 17]}$$

Each of the receivers may design the optimal combiner disclosed in Equation 16. Based on partial channel information fed back from each of the receivers, it is possible to obtain K beamforming vectors maximizing the sum rate using Equation 18.

$$w_{n_1}^{(1)}, \ldots, w_{n_K}^{(K)} = \underset{w_{n_1}^{(1)}, \ldots, w_{n_K}^{(K)}}{\operatorname{argmax}} \sum_{i=1}^{K} \log 2 \quad \text{[Equation 18]}$$

$$\left(1 + w_{n_i}^{(i)*} V_i \left( V_i^* \sum_{m \neq i}^{K} w_{n_m}^{(m)} w_{n_m}^{(m)*} V_i + \frac{K}{\rho} \Sigma_i^{-2} \right)^{-1} V_i^* w_{n_i}^{(i)} \right)$$

In this example, when singular value decomposition (SVD) is performed such as $G_{l_i}^{(i)} = U_i \Sigma_i V_i^*$, $V_i \in \Omega^{M_t \times M_t}$ denotes a right singular matrix and $\Sigma_i \in R^{M_t \times M_t}$ denotes a diagonal singular value.

The transmitter may transmit data streams to the receivers based on beamforming vectors $W_{n_i}^{(i)}$ (i=1, 2, . . . , K). In this instance, an actual sum rate may be calculated according to Equation 19.

$$R_{sum,quant} = E \sum_{i=1}^{K} \log 2(1 + w_{n_i}^{(i)*} H_i^* R_i^{-1} H_i w_{n_i}^{(i)}) \quad \text{[Equation 19]}$$

An example case where $M_r$ is greater than or equal to $M_t$ is described above. Hereinafter, a case where $M_r$ is less than $M_t$ will be described.

When $M_t$ is greater than or equal to $M_r$, a received signal vector of the receiver i may be represented by the following Equation 20.

$$y_i = \sqrt{\frac{\rho}{K}} H_i f_i x_i + \sum_{j \neq i}^{K} \sqrt{\frac{\rho}{K}} H_i f_j x_j + n_i \quad \text{[Equation 20]}$$

In Equation 20, $H_i \in C^{M_r \times M_t}$, $C^{M_r \times M_t}$ denotes a complex space having a dimension of $M_r \times M_t$, $f_i$ denotes a beamforming vector for the receiver i, and $n_i$ denotes a normalized noise vector. Entries of $n_i$ are identically and independently distributed according to a standard normalization distribution N(0, 1). In addition, denotes a transmitted symbol whose energy is $E[|x_i|^2]=1$, and $\rho=P/\sigma^2$ denotes an SNR.

Here, for example, it is assumed that the receivers use a least square combining (LSC) scheme. Also, it is assumed that $f_i$ corresponds to a beamforming vector selected from a beamforming codebook having a size of N2. A combiner according to the LSC scheme may be represented by the following Equation 21.

$$z_i = \frac{(H_i H_i^*)^{-1} H_i f_{n_i}^{(i)}}{\|(H_i H_i^*)^{-1} H_i f_{n_i}^{(i)}\|_2} \quad \text{[Equation 21]}$$

In this example, so as to distinguish a beamforming vector for the receiver from other receivers, the beamforming vector for the receiver i is assumed as $f_{n_i}^{(i)}$. Here, $n_i$ denotes an index of the beamforming vector for the receiver i. When a dedicated pilot is used, the receiver i may recognize $f_{n_i}^{(i)}$ by estimating the effective channel. However, when the dedicated pilot is not used, the transmitter may inform the receiver i about $f_{n_i}^{(i)}$.

An equation of a sum rate having perfect channel information may be represented by the following Equation 22.

$$R_{sum,perf} = E \max_{h^{(1)} \in \Omega^{M_t \times 1}, \ldots, h^{(K)} \in \Omega^{M_t \times 1}} \sum_{i=1}^{K} \log 2(X) \quad \text{[Equation 22]}$$

$$(X) = \left(1 + \frac{|h^{(i)*} \overline{V}_i \overline{V}_i^* h^{(i)}|^2}{\frac{K}{\rho} \left(h^{(i)*} \overline{V}_i (\overline{R}_i)^{-2} \overline{V}_i^* h^{(i)}\right) + \sum_{m \neq i}^{K} |h^{(i)*} \overline{V}_i \overline{V}_i^* h^{(m)}|^2}\right)$$

In Equation 22, $\overline{V}_i$ denotes a row subspace of $H_i = U_i \overline{R}_i \overline{V}_i^*$ where $U_j$ denotes $U_j \in \Omega^{M_r \times M_r}$, $\overline{R}_i \in \Omega^{M_r \times M_r}$, and $\overline{V}_i \in \Omega^{M_r \times M_r}$. The sum rate of Equation 22 may be lower bounded by the following Equation 23.

$$R_{sum,perf} \geq R_{sum,quant} = E \sum_{i=1}^{K} \log 2 \quad \text{[Equation 23]}$$

$$\left(1 + \frac{\|\overline{V}_i \overline{V}_i^* f_{n_i}^{(i)}\|_2^2}{\frac{K}{\rho} \left(f_{n_i}^{(i)*} \overline{V}_i \overline{R}_i^{-2} \overline{V}_i^* f_{n_i}^{(i)}\right) + \sum_{m \neq i}^{K} |f_{n_i}^{(i)*} \overline{V}_i \overline{V}_i^* f_{n_m}^{(m)}|^2}\right)$$

When reconsidering suppressing interference in an interference limited environment, $\rho \to \infty$ may be taken with respect to $R_{sum,quant}$. When $\rho \to \infty$ is taken with respect to $R_{sum,quant}$, Equation 24 may be shown below.

$$R_{sum,quant} \xrightarrow{\rho \to \infty} E \sum_{i=1}^{K} \log 2 \left(1 + \frac{\|\overline{V}_i \overline{V}_i^* f_{n_i}^{(i)}\|_2^2}{\sum_{m \neq i}^{K} |f_{n_i}^{(i)*} \overline{V}_i \overline{V}_i^* f_{n_m}^{(m)}|^2}\right) \quad \text{[Equation 24]}$$

With interpretation of Equation 24, following example embodiments may be proposed. For example, the receiver i may quantize $\overline{V}_i$ using a channel codebook having a size of N1.

In this instance, a channel codebook for the receiver i may be represented by the following Equation 25.

$$\alpha^{(i)} = \{A_1^{(i)}, A_2^{(i)}, \ldots, A_{N1}^{(i)}\} \quad \text{[Equation 25]}$$

Here, codewords included in the channel codebook for the receiver i may be generated according to Equation 26.

$$A_{l_i}^{(i)} = \underset{A_j^{(i)} \in \alpha^{(i)}}{\operatorname{argmax}} \|\overline{V}_i^* A_j^{(i)}\|_F^2 \quad \text{[Equation 26]}$$

Also, it is assumed that each of the receivers has a different channel codebook $\alpha^{(i)}$, and each channel codebook corresponds to a Grassmannian line packing codebook. When a preferred codeword of each of the receivers is $A_{l_1}^{(1)}$, $A_{l_2}^{(2)}, \ldots, A_{l_K}^{(K)}$, each of the receivers may feed back $l_1, l_2, \ldots, l_K$ to the transmitter. Here, $l_i$ denotes an $l^{th}$ codeword in the channel codebook $\alpha^{(i)}$. Each of the receivers may feed back $\|H_i\|_F^2$ to the transmitter so that the transmitter may perform appropriate scheduling.

The transmitter may generate K beamforming vectors for the receivers based on the preferred codeword of each of the receivers. Each of the receivers may have a different beamforming codebook, and the transmitter may select the K beamforming vectors from a beamforming codebook corresponding to each of the receivers. The beamforming vectors selected by the transmitter may be represented by $$f_{n_{l_1}}^{(1)}, f_{n_{l_2}}^{(2)}, \ldots, f_{n_{l_K}}^{(K)} \in \Omega^{M_t \times 1}.$$

Each of the beamforming codebooks corresponding to the receivers may be a Grassmannian line packing codebook. For example, beamforming codebooks of the receiver 1 through a receiver K may be represented by the following Equation 27.

$$F_{l_1}^{(1)} = \left\{ f_{1_{l_1}}^{(1)}, f_{2_{l_1}}^{(1)}, \ldots, f_{N2_{l_1}}^{(1)} \right\}, \ldots,$$
$$F_{l_K}^{(K)} = \left\{ f_{1_{l_K}}^{(K)}, f_{2_{l_K}}^{(K)}, \ldots, f_{N2_{l_K}}^{(K)} \right\}$$

[Equation 27]

In Equation 27, $F_{l_i}^{(i)}$ denotes the beamforming codebook for the receiver i and N2 denotes a size of $F_{l_i}^{(i)}$. A beamforming direction maximizing a signal power of the receiver i using an LSC scheme may need to lie on a subspace $\nabla_i$. Accordingly, two constraints may be proposed, one constraint that $F_{l_i}^{(i)}$ needs to lie on a subspace $A_{l_i}(j)$, and the other constraint that K beamforming vectors $$f_{n_{l_1}}^{(1)}, f_{n_{l_2}}^{(2)}, \ldots, f_{n_{l_K}}^{(K)} \in \Omega^{M_t \times 1}$$

in the transmitter need to be determined to maximize the sum rate calculated together with $A_{l_1}^{(1)}, A_{l_2}^{(2)}, \ldots, A_{l_K}^{(K)}$.

Regarding a subspace codebook $\alpha^{(i)} = \{A_1^{(i)}, A_2^{(i)}, \ldots, A_{N1}^{(i)}\}$ that is assigned to the receiver i, N1 codebooks of $F_j^{(j)} = \{f_{1j}^{(j)}, f_{2j}^{(j)}, \ldots, f_{N2j}^{(j)}\}$ may exist and $F_j^{(j)} = \{f_{1j}^{(j)}, f_{2j}^{(j)}, \ldots, f_{N2j}^{(j)}\}$ is associated with $A_j^{(j)}$ ($j=1, 2, 3, \ldots, N1$). When the transmitter obtains $A_{l_1}^{(1)}, A_{l_2}^{(2)}, \ldots, A_{l_K}^{(K)}$ from each of the receivers, the transmitter may select K beamforming vectors. For example, the transmitter may select the K beamforming vectors according to Equation 28.

$$f_{n_{l_1}}^{(1)}, \ldots, f_{n_{l_K}}^{(K)} = \operatorname*{argmax}_{f_{n_{l_1}}^{(1)} \in F_{l_1}^{(i)}, \ldots, f_{n_{l_K}}^{(K)} \in F_{l_K}^{(K)}} \sum_{i=1}^{K} \log_2$$

[Equation 28]

$$\left( 1 + \frac{\left\| \overline{A}_{l_i} \overline{A}_{l_i}^* f_{n_{l_i}}^{(i)} \right\|_2^2}{\frac{K}{\rho} \lambda_{\min}^{-2} \left\| \overline{A}_{l_i} \overline{A}_{l_i}^* f_{n_{l_i}}^{(i)} \right\|_2^2 + \sum_{m \neq i}^{K} \left| f_{n_{l_i}}^{(i)*} \overline{A}_{l_i} \overline{A}_{l_i}^* f_{n_{l_m}}^{(m)} \right|^2} \right)$$

$$= \operatorname*{argmax}_{f_{n_{l_1}}^{(1)} \in F_{l_1}^{(i)}, \ldots, f_{n_{l_K}}^{(K)} \in F_{l_K}^{(K)}} \sum_{i=1}^{K} \log_2$$

$$\left( 1 + \frac{1}{\frac{K}{\rho} \lambda_{\min}^{-2} + \sum_{m \neq i}^{K} \left| f_{n_{l_i}}^{(i)*} f_{n_{l_m}}^{(m)} \right|^2} \right)$$

Hereinafter, an example of how a beamforming codebook is designed will be described. Equation 24 may provide a beamforming codebook design criterion in an interference-limited region. With a channel subspace quantization and the constraints that $F_j^{(j)}$ needs to lie in $A_j^{(j)}$, it is possible to obtain the following codebook design criterion.

Possible permutations of indexes of preferred codewords selected from K receivers may be represented by Equation 29.

$$\{\gamma\} = \{\gamma_1, \gamma_2, \ldots, \gamma_{(N1)^K}\}$$
$$= \{(1, 1, \ldots, 1), (1, 1, \ldots, 2), \ldots,$$
$$(N1, N1, \ldots, N1)\}$$

$$\{\pi\} = \{\pi_1, \pi_2, \ldots, \pi_{(N2)^K}\}$$
$$= \{(1, 1, \ldots, 1), (1, 1, \ldots, 2), \ldots,$$
$$(N2, N2, \ldots, N2)\}$$

[Equation 29]

In Equation 29, each of $\gamma_j$ and $\pi_i$ denotes a K tuple vector and elements of the K tuple vector correspond to the indexes of the preferred codewords. A beamforming codebook design objective function may be represented by the following Equation 30.

$$\begin{cases} F_1^{(1)}, \ldots, F_{N1}^{(1)} \\ F_1^{(2)}, \ldots, F_{N1}^{(2)} \\ \vdots \\ F_1^{(K)}, \ldots, F_{N1}^{(K)} \end{cases} = \operatorname*{argmax}_{\substack{F_1^{(1)}, \ldots, F_{N1}^{(1)} \\ F_1^{(2)}, \ldots, F_{N1}^{(2)} \\ \vdots \\ F_1^{(K)}, \ldots, F_{N1}^{(K)}}}$$

[Equation 30]

$$\sum_{j=1}^{\|\delta\|} \sum_{i=1}^{\|\pi\|} \sum_{k=1}^{K} \log_2 \left( 1 + \frac{1}{\sum_{m \neq k}^{K} \left| f_{\pi_i(k) \delta_j(k)}^{(k)*} f_{\pi_i(m) \gamma_j(m)}^{(m)} \right|^2} \right)$$

The beamforming codebook design objective function indicates that a beamforming codebook associated with the quantized channel subspace of the receiver i can be designed so that a correlation between codewords from other receivers may be minimized.

To enhance the overall performance, it is assumed that a feedforward link from the transmitter to each of the receivers is available. Through the feedforward link, the transmitter may broadcast information associated with interference statistics to all the receivers.

In this instance, the interference statistics may be represented by the following Equation 31.

$$T = \sum_{k=1}^{K} f_{n_{l_k}}^{(k)} f_{n_{l_k}}^{(k)*}$$

$$T \in C^{M_t \times M_t}$$

[Equation 31]

The interference statistics of Equation 31 may help the receiver i to design an optimal combining vector $z_i$. The optimal combining vector $z_i$ may be represented by the following Equation 32.

$$z_i = \frac{R_i^{-1} H_i f_{n_{l_i}}^{(i)}}{\left\| R_i^{-1} H_i f_{n_{l_i}}^{(i)} \right\|_2}$$

[Equation 32]

In this example, $R_i$ may be calculated according to Equation 33.

$$R_i = \left(H_i(T - f_{n_i}^{(i)} f_{n_i}^{(i)*})H_i^* + \frac{K}{\rho}I_{M_r}\right) \quad \text{[Equation 33]}$$

The transmitter may select K beamforming vectors maximizing the sum rate, based on the channel matrix quantized from each of the receivers. For example, the transmitter may employ Equation 34.

$$f_{n_{l_1}}^{(1)}, \ldots, f_{n_{l_K}}^{(K)} = \quad \text{[Equation 34]}$$

$$\operatorname*{argmax}_{f_{n_{l_1}}^{(1)}, \ldots, f_{n_{l_K}}^{(K)}} \sum_{i=1}^{K} \log 2\left(1 + f_{n_{l_1}}^{(i)*} A_{l_i}\left(A_{l_i}^* \sum_{m \neq i}^{K} f_{n_{l_m}}^{(m)} f_{n_{l_m}}^{(m)*} A_{l_i} + \frac{K}{\rho}\lambda_{min}^{-2} I_{M_r}\right)^{-1} A_{l_i}^* f_{n_{l_1}}^{(i)}\right)$$

Figure 5:
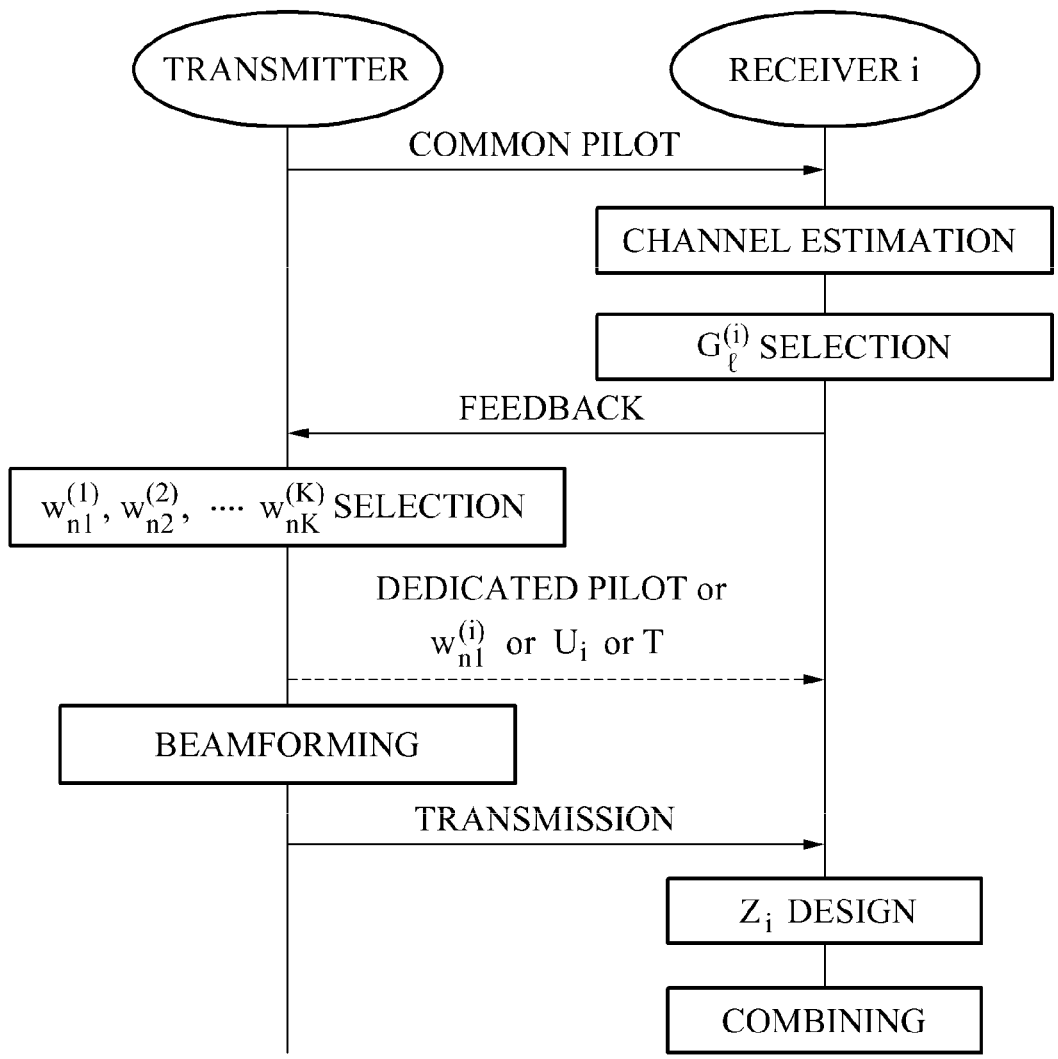
FIG. 5 is a diagram illustrating an example of a communication between a transmitter and a receiver i in a multi-user MIMO communication system.

FIG. 5 illustrates an example of a communication between a transmitter and a receiver i in a multi-user MIMO communication system.

An example case where $M_r$ is greater than or equal to $M_t$ will be described with reference to FIG. 5. Referring to FIG. 5, the transmitter may transmit a common pilot. Each of receivers may estimate a channel. The receiver i, that is, one of the receivers, may also estimate a channel $H_i \in C^{M_r \times M_t}$.

Each of the receivers may have a different channel codebook. The receiver i may select a preferred codeword $G_l^{(i)} \in C^{M_r \times M_t}$ corresponding to the estimated channel, $H_i \in C^{M_r \times M_t}$, using a channel codebook $g^{(i)} = \{G_1^{(i)}, G_2^{(i)}, \ldots, G_{N1}^{(i)}\}$. For example, the receiver i may select $G_l^{(i)} \in C^{M_r \times M_t}$ using Equation 3.

When $G_l^{(i)} \in C^{M_r \times M_t}$ is selected, the receiver i may feed back an index of $G_l^{(i)} \in C^{M_r \times M_t}$ to the transmitter. Similarly, each of all the receivers connected to a cell so as to be served by the transmitter may feed back an index of a corresponding preferred codeword to the transmitter. As described above, $\|H_i\|_F^2$ may also be fed back.

The transmitter may select K beamforming vectors based on the index fed back from each of the receivers. For example, the transmitter may select K beamforming vectors from a beamforming codebook corresponding to each of the receivers in Equation 6.

When the transmitter uses a feedforward link, information associated with the selected beamforming vector may be fed forward. For example, the receiver i may recognize $w_{ni}^{(i)}$ by receiving an index of $w_{ni}^{(i)}$. When the transmitter uses a dedicated pilot, each of the receivers may recognize a corresponding beamforming vector by recognizing a corresponding effective channel.

When the transmitter employs the beamforming codebooks disclosed in Equation 14, the transmitter may feed forward information associated with a rotation matrix and may also feed forward information associated with interference statistics.

It is understood that the aforementioned operations may be applicable to a case where $M_r$ is less than $M_t$ and thus, further description will be omitted here for conciseness.

Figure 6:
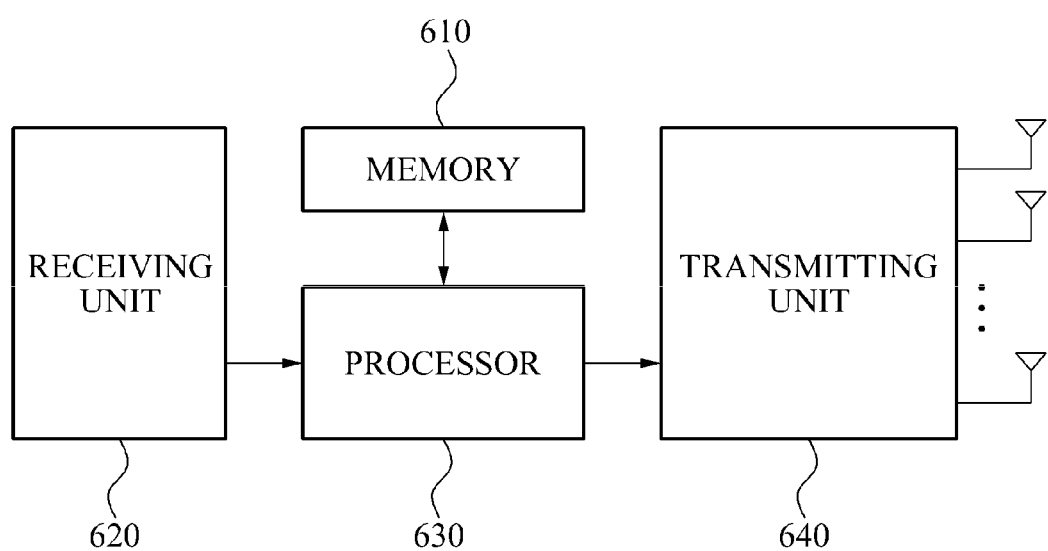
FIG. 6 is a diagram illustrating an example of a transmitter.

FIG. 6 illustrates an example of a transmitter.

Referring to FIG. 6, the transmitter for a multi-user MIMO communication may include a memory 610, a receiving unit 620, a processor 630, and a transmitting unit 640.

The memory 610 may store a beamforming codebook and a channel codebook corresponding to each of receivers. The memory 610 may further store candidates of a rotation matrix and a base codebook.

The transmitting unit 640 may transmit a common pilot according to control of the processor 630. Each of the receivers may estimate a channel and feed back partial channel information, for example, information associated with a preferred codeword, and channel quality information. In a case where a channel codebook corresponding to each of the receivers is different, the transmitter may need to refer to a corresponding channel codebook so as to verify partial channel information of each of the receivers.

For example, the receiving unit 620 may receive information associated with the preferred codeword from each of the receivers. The processor 630 may recognize the preferred codeword of each of the receivers by referring to the channel codebook of each of the receivers that is pre-stored in the memory 610.

When the preferred codeword of each of the receivers is recognized, the processor 630 may generate K beamforming vectors from a beamforming codebook of each of the receivers that is pre-stored in the memory 610 based on the preferred codeword of each of the receivers. Here, K denotes a number of receivers.

When beamforming vectors are determined and in this instance a feedforward link is available, the processor 630 may generate information associated with the beamforming vectors, information associated with interference statistics, information associated with a rotation matrix corresponding to each of the receivers, and the like.

The transmitting unit 640 may transmit precoded data streams to the receivers using the beamforming vectors. Here, the transmitting unit 640 may selectively transmit information associated with the beamforming vectors, information associated with the interference statistics, information associated with the rotation matrix corresponding to each of the receivers, and the like. When a dedicated pilot is available, the transmitting unit 640 may also transmit the dedicated pilot.

It is understood that descriptions made above with reference to FIG. 1 through FIG. 5 may be applicable to the transmitter of FIG. 6 and thus further descriptions will be omitted here for conciseness.

Figure 7:
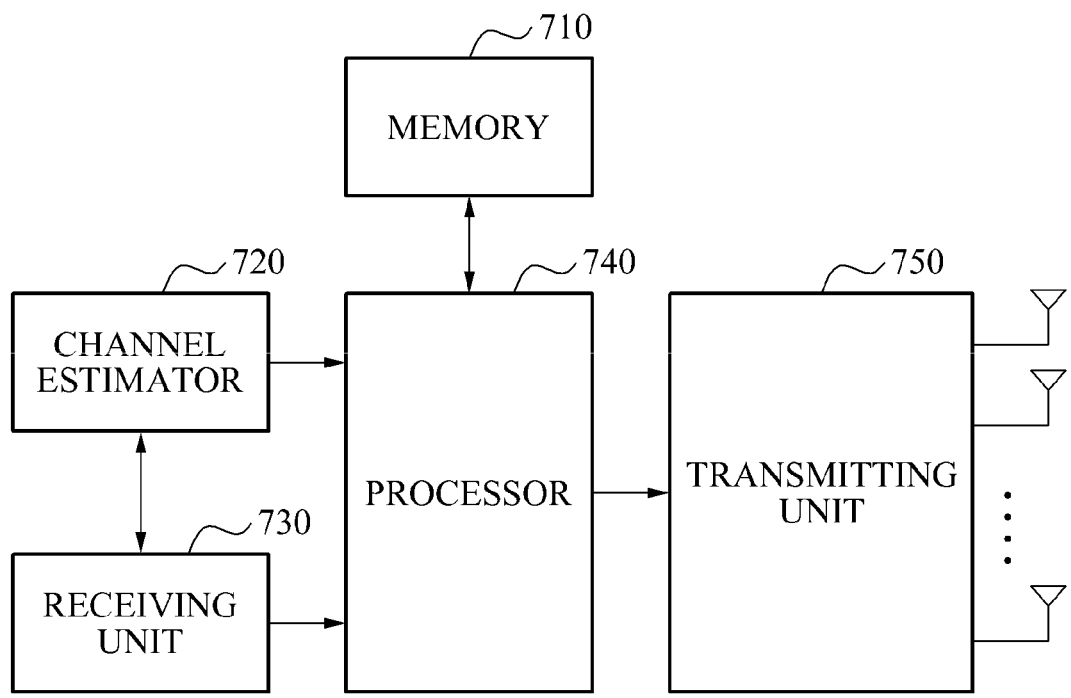
FIG. 7 is a diagram illustrating an example of a receiver.

FIG. 7 illustrates an example of a receiver.

Referring to FIG. 7, the receiver for a multi-user MIMO communication may include a memory 710, a channel estimator 720, a receiving unit 730, a processor 740, and a transmitting unit 750.

The memory 610 may store a beamforming codebook and a channel codebook corresponding to the corresponding receiver. The memory 610 may further store candidates of a rotation matrix and a base codebook.

When a common pilot is transmitted from a transmitter, the common pilot may be provided from the receiving unit 730 to the processor 740. The channel estimator 720 may estimate a channel formed between the receiver and the transmitter.

The processor 740 may select a preferred codeword from the channel codebook that is pre-stored in the memory 610, based on the estimated channel. Information associated with the preferred codeword may be fed back via the transmitting unit 750.

When the transmitter determines a beamforming vector corresponding to the corresponding receiver and then precodes a data stream using the determined beamforming vector, the received data stream may be processed by the processor 740. The processor 740 may design an optimal combiner based on information associated with beamforming vectors, information associated with interference statistics, and information associated with a rotation matrix that are fed forward from the transmitter, or based on an effective channel that is estimated based on a dedicated pilot transmitted from the transmitter. The received data stream may be processed according to the optimal combiner.

Again, descriptions made above with reference to FIG. 1 through FIG. 5 may be applicable to the receiver of FIG. 7 and thus further descriptions will be omitted here for conciseness.

The processes, functions, methods and/or software described above may be recorded, stored, or fixed in one or more non-transitory computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules so as to perform the operations and methods described above, or vice versa. In addition, a non-transitory computer-readable storage medium may be distributed among computer systems connected through a network and non-transitory computer-readable codes or program instructions may be stored and executed in a decentralized manner.

As a non-exhaustive illustration only, a terminal described herein may refer to mobile devices such as a cellular/smart phone, a personal digital assistant (PDA), a digital camera, a portable game console, and an MP3 player, a portable/personal multimedia player (PMP), a handheld e-book, a portable lab-top/tablet PC, a global positioning system (GPS) navigation, and devices such as a desktop PC, a high definition television (HDTV), an optical disc player, a setup box, and the like capable of communication or network communication consistent with that disclosed herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method of a transmitter for a multi-user multiple input multiple output (MIMO) communication system, the method comprising:
   maintaining a memory in which a first channel codebook corresponding to a first receiver and a second channel codebook corresponding to a second receiver are stored;
   receiving, from the first receiver, information associated with a first preferred codeword among codewords comprised in the first channel codebook, and receiving, from the second receiver, information associated with a second preferred codeword among codewords comprised in the second channel codebook; and
   determining a first beamforming vector for the first receiver from a first beamforming codebook and a second beamforming vector for the second receiver from a second beamforming codebook based on the first preferred codeword and the second preferred codeword, respectively,
   wherein the first channel codebook is different from the second channel codebook, the first channel codebook is different from the first beamforming codebook, and the second channel codebook is different from the second beamforming codebook,
   the first beamforming codebook is generated by performing an inner product with respect to a first unitary rotation matrix and each of codewords comprised in a pre-defined base codebook, and
   the second beamforming codebook is generated by performing an inner product with respect to a second unitary rotation matrix and each of the codewords comprised in the pre-defined base codebook, and the second unitary rotation matrix is different from the first unitary rotation matrix.

2. The method of claim 1, wherein:
   information associated with the first preferred codeword is associated with a covariance of a first channel formed between the transmitter and the first receiver, and
   information associated with the second preferred codeword is associated with a covariance of a second channel formed between the transmitter and the second receiver.

3. The method of claim 1, wherein:
   the codewords comprised in the first channel codebook are defined based on vectors comprised in a Grassmannian line packing codebook having a dimension of MtMr1×1,
   the codewords comprised in the second channel codebook are defined based on vector of a Grassmannian line packing codebook having a dimension of MtMr2×1, and
   Mr1 denotes a number of receive antennas of the first receiver, Mr2 denotes a number of receive antennas of the second receiver, and Mt denotes a number of transmit antennas of the transmitter.

4. The method of claim 3, wherein:
   the vectors comprised in the (MtMr1×1) Grassmannian line packing codebook are transformed to matrices each having a dimension of Mt×Mr1, and the codewords comprised in the first channel codebook are defined by the (Mt×Mr1) matrices, and
   the vectors comprised in the (MtMr2×1) Grassmannian line packing codebook are transformed to matrices each having a dimension of Mt×Mr2, and the codewords comprised in the second channel codebook are defined by the (Mt×Mr2) matrices.

5. The method of claim 1, wherein the second beamforming codebook is different from the first beamforming codebook.

6. The method of claim 1, further comprising:
   providing information associated with the first unitary rotation matrix to the first receiver, and providing information associated with the second unitary rotation matrix to the second receiver.

7. The method of claim 1, wherein a minimum distance between first beamforming codewords comprised in the first beamforming codebook is the same as a minimum distance between second beamforming codewords comprised in the second beamforming codebook.

8. The method of claim 7, wherein each of the first beamforming codebook and the second beamforming codebook is configured to minimize a correlation between the first beamforming codewords and the second beamforming codewords.

9. The method of claim 1, wherein the determining comprises:

calculating a sum rate with respect to the first receiver and the second receiver based on a criterion that each of the first receiver and the second receiver corresponds to a zero-forcing linear receiver; and selecting the first beamforming vector for the first receiver and the second beamforming vector for the second receiver based on the sum rate with respect to the first receiver and the second receiver.

10. The method of claim 1, further comprising:

calculating interference statistics based on an inner product between the first beamforming vector and a Hermitian of the first beamforming vector, and an inner product between the second beamforming vector and a Hermitian of the second beamforming vector; and providing information associated with the interference statistics to the first receiver and the second receiver.

11. A communication method of a second receiver for a multi-user MIMO communication system comprising a transmitter, a first receiver, and the second receiver, the method comprising:

maintaining a memory in which a second channel codebook and a second beamforming codebook corresponding to the second receiver are stored, the second channel codebook being different from a first channel codebook corresponding to the first receiver;

calculating a covariance of a second channel formed between the transmitter and the second receiver;

selecting a second preferred codeword from codewords comprised in the second channel codebook, based on the covariance of the second channel;

providing information associated with the second preferred codeword to the transmitter;

recognizing a second beamforming vector from the second beamforming codebook when the transmitter uses the second beamforming vector based on the second preferred codeword; and calculating a reception combining vector according to the second beamforming vector and the second channel, wherein the second channel codebook is different from the second beamforming codebook, the first beamforming codebook is generated by performing an inner product with respect to a first unitary rotation matrix and each of codewords comprised in a pre-defined base codebook, and the second beamforming codebook is generated by performing an inner product with respect to a second unitary rotation matrix and each of the codewords comprised in the pre-defined base codebook, and the second unitary rotation matrix is different from the first unitary rotation matrix.

12. The method of claim 11, further comprising:

calculating an effective channel formed between the transmitter and the second receiver, based on a dedicated pilot for the second receiver that is transmitted from the transmitter, wherein the recognizing comprises recognizing the second beamforming vector based on the effective channel.

13. The method of claim 11, wherein the recognizing comprises recognizing the second beamforming vector using information associated with the second unitary rotation matrix.

14. The method of claim 11, further comprising:

receiving, from the transmitter, information associated with interference statistics that are calculated based on an inner product between a first beamforming vector for the first receiver and a Hermitian of the first beamforming vector, and an inner product between the second beamforming vector and a Hermitian of the second beamforming vector, wherein the calculating of the reception combining vector comprises calculating the reception combining vector based on the interference statistics.

15. A terminal for a multi-user MIMO communication system comprising a transmitter and another terminal, the terminal comprising:

a memory configured to store a channel codebook and a beamforming codebook corresponding to the terminal, the channel codebook being different from a channel codebook corresponding to the another terminal;

a receiving unit configured to receive a signal from the transmitter that is precoded based on a beamforming vector from the beamforming codebook;

a channel estimator configured to estimate a channel formed between the terminal and the transmitter;

a processor configured to select a preferred codeword from codewords comprised in the channel codebook based on a covariance of the channel formed between the terminal and the transmitter; and a transmitting unit configured to provide information associated with the preferred codeword to the transmitter, wherein the channel codebook is different from the beamforming codebook, the beamforming codebook corresponding to the other terminal is generated by performing an inner product with respect to a first unitary rotation matrix and each of codewords comprised in a pre-defined base codebook, and the beamforming codebook corresponding to the terminal is generated by performing an inner product with respect to a second unitary rotation matrix and each of the codewords comprised in the pre-defined base codebook, and the second unitary rotation matrix is different from the first unitary rotation matrix.

16. The terminal of claim 15, wherein the processor calculates a reception combining vector according to a beamforming vector and the channel formed between the terminal and the transmitter, the beamforming vector being provided by the transmitter based on the preferred codeword.

17. The terminal of claim 15, wherein:

the channel estimator estimates an effective channel formed between the terminal and the transmitter, based on a dedicated pilot for the terminal that is transmitted from the transmitter, and the beamforming vector is recognized by the terminal based on the effective channel.

18. The terminal of claim 16, wherein:

the beamforming vector for the terminal is recognized by the terminal using information associated with the second unitary rotation matrix.

19. The terminal of claim 16, wherein:

the receiving unit receives, from the transmitter, information associated with interference statistics that are calculated based on an inner product between a beamforming vector for the another terminal and a Hermitian of the beamforming vector for the another terminal, and an inner product between the beamforming vector for the terminal and a Hermitian of the beamforming vector for the terminal, and the processor calculates the reception combining vector based on the interference statistics.

* * * * *